June 8, 1954  P. A. DE PADOVA ET AL  2,680,433
SIMPLIFIED LUBRICATING SYSTEM FOR JET ENGINES
Filed July 18, 1952
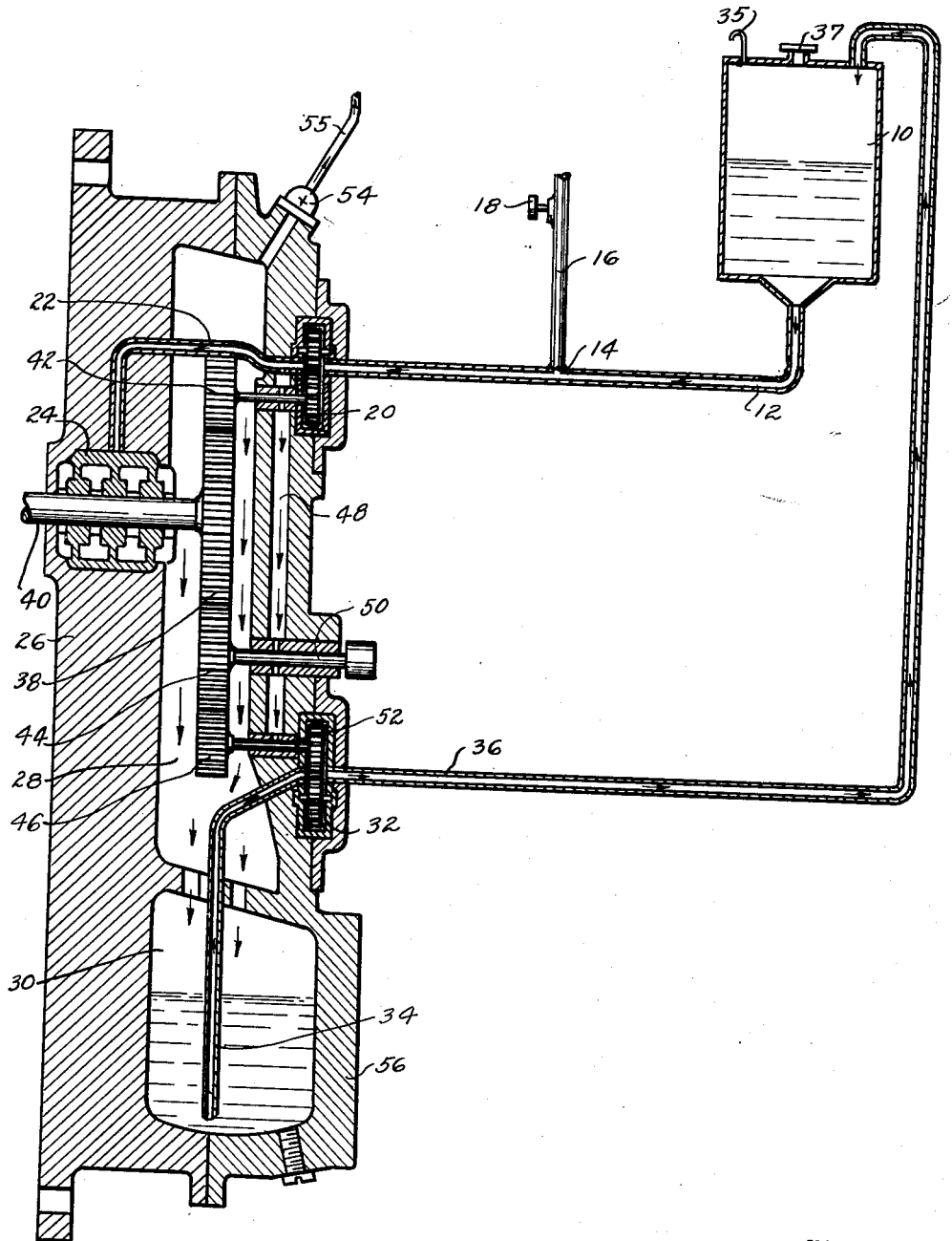
INVENTORS.
PASQUALE A. De PADOVA
VINCENT CONDELLO
BY
ATTORNEYS Patented June 8, 1954

2,680,433

UNITED STATES PATENT OFFICE 2,680,433

SIMPLIFIED LUBRICATING SYSTEM FOR JET ENGINES

Pasquale A. De Padova, Newark, and Vincent Condello, Teaneck, N. J., assignors to the United States of America as represented by the Secretary of the Air Force Application July 18, 1952, Serial No. 299,572

2 Claims. (Cl. 123—196)

This invention relates to lubrication systems for jet propulsion engines and has special reference to the jet propulsion engines which are required to remain in continuous operation over extended periods of time.

In conventional aircraft engines, in order to reduce to a minimum the volume of lubricating oil which must be carried, a cooler is provided and a predetermined volume of oil is caused to circulate first through the engine then through the cooler, etc. A coolant, usually air from the flight stream is scooped and brought in to neutralize the heat absorbed by the lubricating oil, the same oil being circulated over and over.

In jet propulsion applications, however, due to the restriction of the number of fluids to be used and due also to the requirement that these engines operate at high altitudes where the use of air as a coolant is much less effective, the lubrication system adapted to such applications is quite complex, since, if no lubricant cooler is to be used, an excessive amount of oil will have to be carried along and expended as it becomes heated, while if an oil cooler is used, then an expendable volume of coolant will have to be carried in addition to the weight of the cooler, valves, lines and other components.

It is therefore an object of this invention to provide a jet propulsion engine lubricating system of less weight and greater efficiency than when made according to presently known construction.

We attain this object in the system hereinafter described and illustrated by the single figure of the drawing in which:

Lubricant for the improved system herein disclosed consists of oil flowing from a tank 10 through pipe 12 within which it is diluted with gasoline injected at 14 through pipe 16, a valve 18 being provided to control the gasoline flow.

Pipe 12 extends to the suction side of the lubricant pump 20, the discharge or pressure side of the pump being connected by a pipe 22 to the main drive shaft bearings 24, which are contained in the housing 26.

After passing through the bearings 24, the lubricant flows by gravity down through the space 28 into the sump 30 from which it is drawn by a scavenger pump 32 through a pipe 34 which extends from the bottom of the sump 30 to the suction side of the scavenger pump 32, the discharge side of the pump 32 being connected by a pipe 36 to the top of the oil tank 10. The usual vent 35 and filler cap 37 are provided.

A gear 38 fast on the main drive shaft 40, drives the pressure pump 20 through a pinion 42. The same gear 38 drives the scavenger pump 32 through idler gear 44 and pinion 46. A duct 48 extends downward from the pipe 22 at the discharge side of the pressure pump 20 to lubricate the idler shaft bearing 50 and the pump shaft bearing 52. A suction pump 54 is provided to keep the space 28 within the housing 26 and its cover 56 at a moderate negative pressure.

The operation of the improved lubricating system for jet engines herein disclosed may preferably be substantially as follows:

The tank 10 is filled to a predetermined level with the proper grade of lubricating oil. When the engine is started, the oil pressure pump 20 draws oil from the tank 10 through pipe 12. The gasoline valve 18 is then opened to admit a predetermined quantity of gasoline which is mixed with the oil and drawn through pump 20 and forced through bearings 24, 50 and 52, and such other parts as require lubrication.

The lubricating mixture, after thus performing the lubricating function, discharges into the space 28, and, due to low pressure in space 28 maintained by operation of the suction pump 54, the gasoline will evaporate and separate from the lubricating oil and in doing so will remove the friction heat from the oil and surrounding parts. The gasoline thus evaporated will pass out the vent 55 and be expended.

The oil, thus cooled, will be discharged into sump 30 and will be drawn by the scavenger pump 32 up through pipe 34 and discharge through pipe 36 into the top of the tank 10 ready for recirculation as above described.

The amount of gasoline expended by evaporation in this case is but a small fraction of the weight of an oil cooler, its piping, valves and component parts.

The amount of gasoline evaporated and the pressure within space 28 can be varied to suit the necessary engine lubrication and heat removal requirements by regulating the amount of gasoline injected at 14 and the pressure within chamber 28, by the action of suction pump 54.

Having shown and described an embodiment of our invention, we claim:

1. In a jet engine lubricating system, a lubricant supply tank, conduit means connecting said tank with the engine bearings, gasoline injector means connected in said conduit means for mixing gasoline with the lubricant therein, pump means interposed in said conduit means following gasoline injection for pumping the mixture to the bearings, a sump associated with the bearings through a discharge channel to receive the lubricant mixture therefrom, a suction pump connected with the discharge channel for producing a low pressure therein whereby the gasoline will separate from the lubricant mixture removing the friction heat therefrom, and means for discharging the lubricant from the sump back to the supply tank.

2. In a jet engine lubricating system, a lubricant supply tank, conduit means connecting said supply tank and the engine bearings, gasoline injector means connected in said conduit means for mixing gasoline with the lubricant therein, first pump means interposed in said conduit means following the gasoline injection for pumping the mixture to the bearings, a sump receiving the mixture from the bearings through a discharge channel, a suction pump connected with said discharge channel for producing a low pressure therein whereby the gasoline will separate from the lubricant removing the friction heat from the lubricant and surrounding parts and a scavenge pump drivingly related with said first pump means for returning the lubricant from the sump.

References Cited in the file of this patent

UNITED STATES PATENTS

| Number | Name | Date |
|---|---|---|
| 2,400,910 | Booth | May 28, 1946 |
| 2,453,602 | Strickler | Nov. 9, 1948 |
| 2,575,315 | Edwards | Nov. 13, 1951 |

FOREIGN PATENTS

| Number | Country | Date |
|---|---|---|
| 588,712 | Great Britain | June 2, 1947 |